United States Patent
Hulls

[11] Patent Number: 6,095,715
[45] Date of Patent: *Aug. 1, 2000

[54] MONOCOQUE COMPOSITE JOINT

[75] Inventor: John R. Hulls, Point Reyes, Calif.

[73] Assignee: Altamont, Inc., Key Biscayne, Fla.

[ * ] Notice: This patent is subject to a terminal disclaimer.

[21] Appl. No.: 09/096,845

[22] Filed: Jun. 11, 1998

Related U.S. Application Data

[63] Continuation-in-part of application No. 08/884,102, Jun. 27, 1997, abandoned, which is a continuation of application No. 08/448,814, May 24, 1995, abandoned, which is a continuation of application No. 08/071,243, Jun. 2, 1993, Pat. No. 5,472,290.

[51] Int. Cl.$^7$ ........................................... F16B 5/00
[52] U.S. Cl. ........................ 403/403; 403/231; 403/404; 52/270; 52/282.4; 52/284
[58] Field of Search ..................... 403/231, 233, 403/205, 403, 404, 401, 402, 305; 52/270, 272, 232.3, 232.4, 284, 79.1; 296/29, 30, 181, 183, 191, 901

[56] References Cited

U.S. PATENT DOCUMENTS

| | | | |
|---|---|---|---|
| 2,934,372 | 4/1960 | Jewell et al. | 296/28 |
| 3,733,102 | 5/1973 | Serino et al. | 296/164 |
| 4,065,885 | 1/1978 | Blick, III et al. | 52/143 |
| 5,041,318 | 8/1991 | Hulls | 428/57 |
| 5,320,403 | 6/1994 | Kazyak | 296/29 X |
| 5,403,063 | 4/1995 | Sjostedt et al. | 296/187 |
| 5,472,290 | 12/1995 | Hulls | 403/407.1 |
| 5,706,624 | 1/1998 | Lipson | 403/403 X |

*Primary Examiner*—Harry C. Kim
*Attorney, Agent, or Firm*—Francis Law Group

[57] ABSTRACT

A monocoque joint for joining panels having a first skin portion having a first exterior surface and a first interior surface, a second skin portion having a second exterior surface and a second interior surface, a plurality of web sections, each of the web sections being in communication with the first interior surface and the second interior surface, the web sections and the first and second interior surfaces defining a plurality of core regions, and first and second tapered flange sections disposed on opposing ends of the joint. The first and second flange sections are formed integrally with the first and second skin portions and are adapted to receive preformed panels. The joint provides a substantially continuous integral load path whereby when the first and second flange sections are operatively attached to preformed panels and subjected to a load, the load is substantially uniformly transmitted to the panels.

13 Claims, 7 Drawing Sheets

(1 of 7 Drawing Sheet(s) Filed in Color)

MONOCOQUE COMPOSITE JOINT

CROSS-REFERENCE TO RELATED APPLICATIONS

This is a continuation-in-part of application Ser. No. 08/884,102, filed Jun. 27, 1997, now abandoned, which is a continuation of application Ser. No. 08/448,814, filed May 24, 1995, now abandoned, which is a continuation of application Ser. No. 08/071,243, filed Jun. 2, 1993, now U.S. Pat. No. 5,472,290.

FIELD OF THE PRESENT INVENTION

The present invention relates generally to composite joints for connecting wall structures. More particularly, the invention relates to a monocoque composite joint for connecting wall structures.

BACKGROUND OF THE INVENTION

Composite structural members are well known in the art. Such structures generally comprise two or more fiber layers made of a high tensile and compressive strength material, such as glass or carbon, encased within a suitable resin matrix and a core material sandwiched between the layers.

Due to the desirable strength to weight ratio, composite members have been employed in a number of applications, including vehicle body modules or panels. Illustrative is the structure disclosed in U.S. Pat. No. 5,042,395.

A major drawback of the noted structure is the undesirable stress concentrations at the panel joints. Indeed, in the structure disclosed in U.S. Pat. No. 5,042,395, the support frame is riveted or screwed to the cover layers at the fitting connections between the body panels.

Referring to FIG. 1, there is shown a cross-sectional view of a conventional structure employing pultruded composite materials connected by a joint 2. The joint, which connects flat preformed panels 4, 6, is typically formed out of aluminum.

In the noted illustration, the preformed panels 4, 6 comprise outer skin portions 4a, 6a, inner skin portions 4b, 6b and core materials 4c, 6c. The preformed panels 4, 6 are attached to the joint 2 by adhesive layers 8 and 10, respectively.

A problem with this type of joint 2 is that it cannot, and will not, adequately protect the structure against the torsion loads, such as that caused by a tractor trailer truck on uneven roads and bumps, or the bending forces caused by loads in the trailer. As illustrated in FIG. 2, when the floor 22 of the trailer 20 is loaded in the direction denoted by Arrow P, the floor 22 deflects downward in the direction denoted by Arrow D, producing tensile forces at the joining edges 23a, 23b of the floor 22 and compressive forces at the joining edges 24a, 24b of the top 21. For this reason, in the conventional trailer construction shown in FIG. 1, the corner joints are made sufficiently stiff so that they carry virtually all the compressive and tension load. The size and resulting stiffness of the corner joint is such that the wall panels provide little contribution to the load carrying structure.

Further, as illustrated in FIG. 1, the bending loads (denoted by Arrow A) at the conventional joint 2 result in undesirable stress concentrations at the skins 4a, 6a of the preformed panels 4, 6 at points 12, 14. The bending loads also urge the panel skins together, crushing the core, or urge the skins apart, causing them to separate from the core material.

Various techniques and/or joint structures have been employed to provide a cost effective and efficient joint for body panels. Illustrative are joints disclosed in U.S. Pat. Nos. 4,662,138; 5,403,063 and 2,934,372. Although each of the noted joints have been deemed acceptable for narrowly defined applications, the resultant stress patterns exhibited by the joints under load is far from optimum.

It is, therefore, an object of the present invention to provide a substantially monocoque joint structure having an optimum stress distribution under load.

It is another object of the present invention to provide a substantially monocoque joint structure which provides a continuous integral load path to joined panels when subjected to conventional loads.

It is another object of the present invention to provide a substantially monocoque joint structure which exhibits a substantially uniform stress profile under conventional loads.

It is yet another object of the present invention to provide a substantially monocoque joint structure which is lightweight, cost effective and efficient.

SUMMARY OF THE INVENTION

In accordance with the above objects and those that will be mentioned and will become apparent below, the monocoque composite joint in accordance with this invention comprises a first skin portion having a first exterior surface and a first interior surface, a second skin portion having a second exterior surface and a second interior surface, a plurality of web sections, each of the web sections being in communication with the first interior surface and the second interior surface, the web sections and the first and second interior surfaces defining a plurality of core regions, and first and second tapered flange sections disposed on opposing ends of the joint. The first and second flange sections are formed integrally with the first and second skin portions and are adapted to receive preformed panels.

In a preferred embodiment of the invention, the joint provides a substantially continuous integral load path whereby when the first and second flange sections are operatively attached to preformed panels and subjected to a load, the load is substantially uniformly transmitted to the panels.

BRIEF DESCRIPTION OF THE DRAWINGS

The file of this patent contains at least one drawing executed in color. Copies of this patent with color drawings will be provided by the Patent and Trademark Office upon request and payment of the necessary fee.

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

The disclosed monocoque composite joint substantially reduces or eliminates the disadvantages and shortcomings associated with prior art composite joints. By the term "monocoque" as used herein, it is meant to mean a composite structure in which all or most of the stresses are carried by the skin(s).

According to the invention, the unique joint exhibits an optimum, substantially uniform stress profile while under conventional load. The joint further provides a continuous integral load path which transmits substantially uniform loads to the joined panels.

Figure 3:
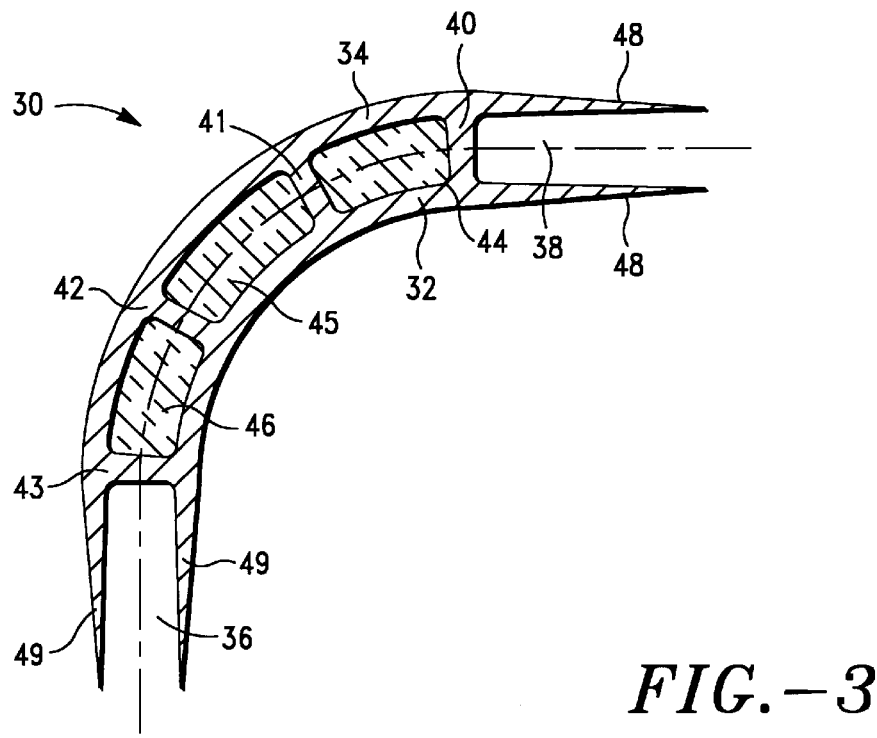
FIG. 3 is a cross-sectional view of a preferred embodiment of the monocoque joint according to the invention.

Referring first to FIG. 3, there is shown a cross-sectional view of a preferred embodiment of the monocoque composite joint of the present invention. The joint 30 includes an inner skin portion 32, an outer skin portion 34, two outer joint-forming sections 36, 38, a plurality of web portions 40, 41, 42, 43, and a plurality of core segments 44, 45, 46.

According to the invention, the inner and outer skin portions 32, 34 comprise a layered fiberglass cloth and resin structure (i.e., laminate structure). Preferably, each skin portion 32, 34 includes 4 to 6 layers of the noted fiberglass structure.

In a preferred embodiment, the skin portions 32, 34 have a tensile strength in the range of 48–56 ksi@0° (i.e., fiber orientation) and 12–16 ksi@90°. The skin portions 32, 34 further have a compressive strength in the range of 48–56 ksi@0° and 16–20 ksi@90°.

The web portions 40, 41, 42, 43 of the joint 30 similarly comprise a layered fiberglass cloth and resin structure having a minimum tensile strength of 48 ksi@0° and 12 ksi@90°. The web portions 40, 41, 42, 43 further have a minimum compressive strength of approx. 48 ksi@0° and 16 ksi@90°.

In additional envisioned embodiments of the invention, the web portions 40, 41, 42, 43 and the skin portions 32, 34 can comprise a layered graphite fiber structure. As will be appreciated by one having ordinary skill in the art, various equivalent composite materials may be employed to fabricate the web portions 40, 41, 42, 43 and the skin portions 32, 34.

As illustrated in FIG. 3, the joint 30 also includes a plurality of core segments 44, 45, 46, which are bounded by the web portions 40, 41, 42, 43. In a preferred embodiment, the core segments 44, 45, 46 comprise a closed cell foam (e.g., PVC, polystyrene, polyurethane, etc.), having a minimum compressive strength of approx. 5 psi. In additional envisioned embodiments, the core segments 44, 45, 46 can comprise honeycomb structures, end grained balsa or like materials.

As will be appreciated by one having ordinary skill in the art, the number of web portions, and the configuration and position thereof can be modified to achieve the advantages of the invention. Further, the discontinuous core can be achieved by virtue of varying the density of the core material in predetermined regions (e.g., proximate the joint forming sections 36, 38).

The resultant joint 30 structure is thus lightweight, yet highly efficient. As discussed in detail below, the unique "discontinuous core" also facilitates the optimum stress distribution throughout the joint 30 when the joint 30 is subjected to bending and/or torsional loading.

As illustrated in FIG. 3, each outer joint-forming section 36, 38 includes a pair of tapered flange sections 48, 49. The tapered flange sections 48, 49 are preferably integrally formed with skin portions 32, 34.

As discussed in detail herein, the tapered flange sections 48, 49 are formed in a manner whereby when the outer joint forming sections 36, 38 are operatively connected to preformed panels and the joint 30 is subjected to loading (e.g., bending, torsion), the joint 30 will not act as a hinge but will provide a continuous integral load path, transmitting loads to the skins of joined preformed panels. In other words, the joint 30 will not deform about its axis (i.e., a hinge), but will uniformly transmit the loads to the preformed panels.

A key characteristic of the unique monocoque joint of the invention is the incorporation of the web portions 40, 41, 42, 43. According to the invention, the web portions 40, 41, 42, 43 are substantially evenly spaced and are integrally formed with the skin portions 32, 34. In a preferred embodiment of the invention, each web portion 40, 41, 42, 43 is disposed substantially perpendicular to the neutral axis 30$a$ of the joint 30. The resultant structure thus functions in a manner similar to a classic "I-beam" structure.

Applicant has found that the unique configuration shown in FIG. 3 exhibits an optimum, substantially uniform stress profile while under conventional loading. The joint 30 further prevents local buckling from multi-directional loading.

According to the invention, the optimum joint stress profile and the unique load transmission characteristic of the joint 30 is achieved by virtue of the synergistic relationship by and between the laminate configurations (i.e., skin portions 32, 34 and web portions 40, 41, 42, 43), the laminate schedule (i.e., fiber orientations) and the discontinuous core (i.e., core segments 44, 45, 46).

According to the invention, the laminate fibers are oriented at an angle of about plus or minus 45° to the joint axis. The noted orientation subjects the fibers to substantially pure tension or compression in response to shear loads. To resist loading in the direction of the joint axis, fibers oriented at 0° to the joint axis are employed in the flange sections 48, 49 web portions 40, 41, 42, 43 and skin portions 32, 34 of the joint 30.

Referring to Table I, there is shown a preferred load schedule for (i) the laminate fibers in the 5 skin portions 32, 34 of the joint 30, (ii) the web portions 40, 41, 42, 43 and (iii) the panels 50, 52. It can be seen that the monocoque joint of the invention exhibits optimum load sharing between the layers of the laminates. For example, merely 15 wt. % of the fibers in the joint reflect bending loads transverse to the web (i.e., load is transferred to skin).

TABLE I

| | fiber load schedule (% by wt. of fiber) | | |
|---|---|---|---|
| | | LOAD | |
| STRUCTURE | Shear | Bending | Compressive/Tensile |
| Joint | 50 | 15 | 33 |
| Web | 50 | 15 | 33 |
| Panel(s) | 50 | 50 | 0 |

Figure 5:
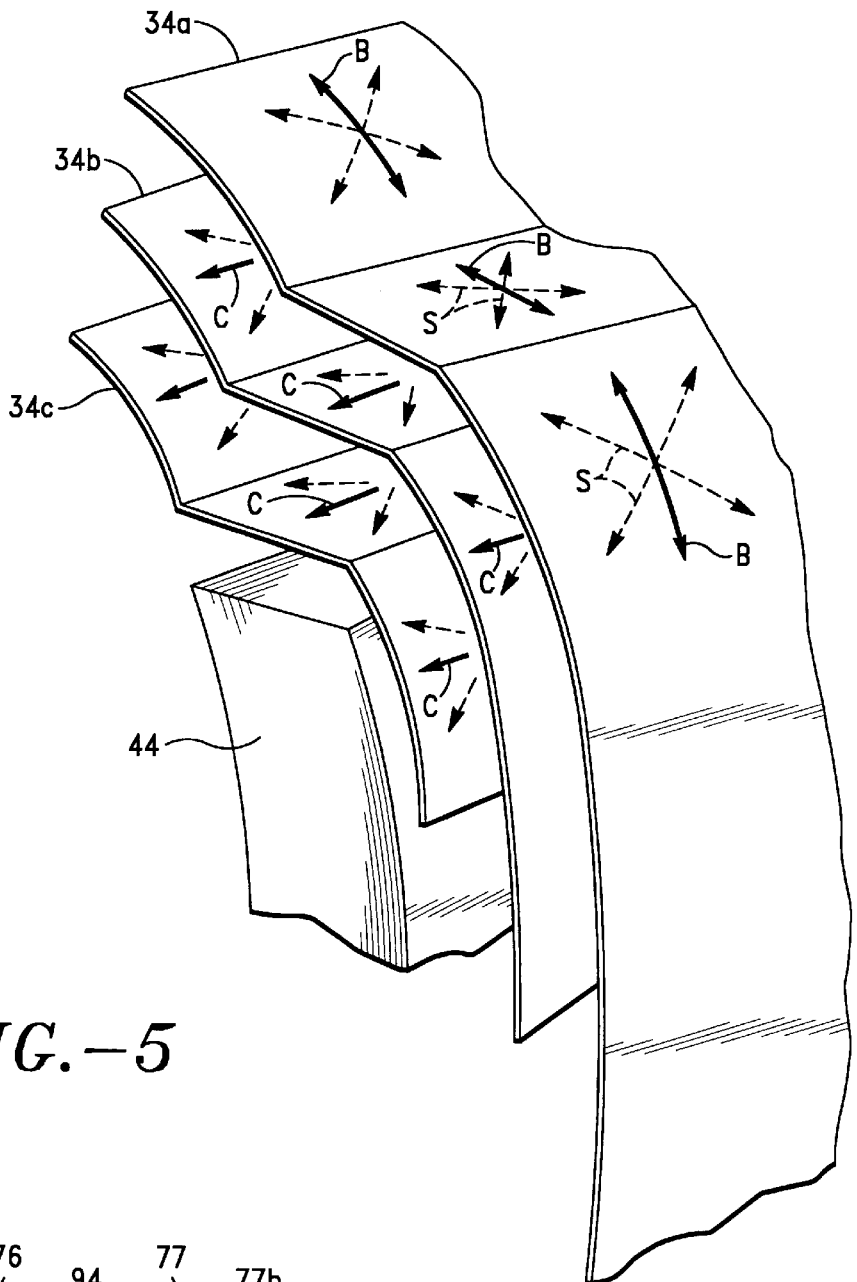
FIG. 5 is a perspective illustration of the load paths of the laminate skin portions of the monocoque joint according to the invention.

Referring now to FIG. 5, there is shown a schematic illustration of the applied loads in the laminate layers 34a, 34b, 34c of the outer skin portion 34. According to the invention, the unidirectional (90°) fibers in layer 34a (denoted by Arrows B) are subjected to tensile and compressive loading, the 45° fibers (denoted by Arrows S) are subjected to shear loading, and the unidirectional fibers in layers 34b, 34c (denoted by Arrows C) are similarly subjected to tensile and compressive loading.

Figure 4:
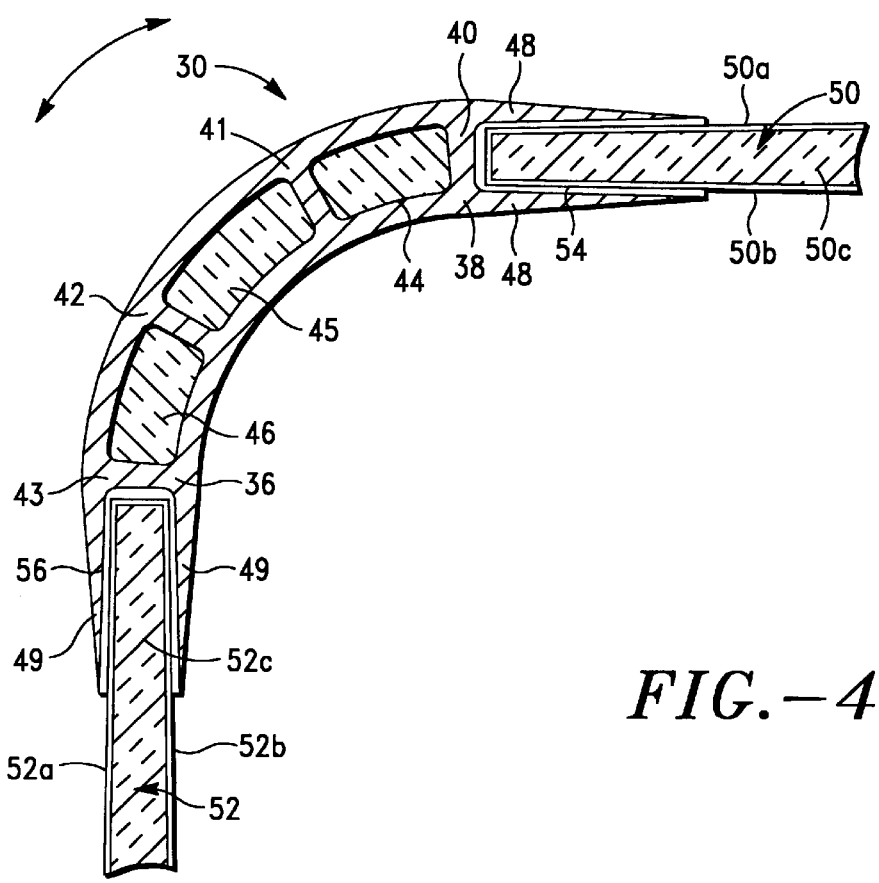
FIG. 4 is a cross-sectional view of the monocoque joint shown in FIG. 3 joined to preformed panels according to the invention.

Referring now to FIG. 4, there is shown a cross-sectional view of the monocoque joint of the invention joined to preformed panels 50, 52. According to the invention, the joint 30 is connected to the preformed panels 50, 52 at the tapered flange sections 48, 49.

The tapered flange sections 48, 49 are preferably attached to the preformed panels 50, 52 using a conventional adhesive 54, 56. Alternatively, the tapered flange sections 48, 49 can be secured to the preformed panels 50, 52 by other fastening means.

As illustrated in FIG. 4, the tapered flange sections 48, 49 extended outwardly from web portions 40, 43. In a preferred embodiment, each flange section 48, 49 has a length of approximately 5–9 times the joined panel thickness proximate the flange sections 48, 49.

Figure 7:
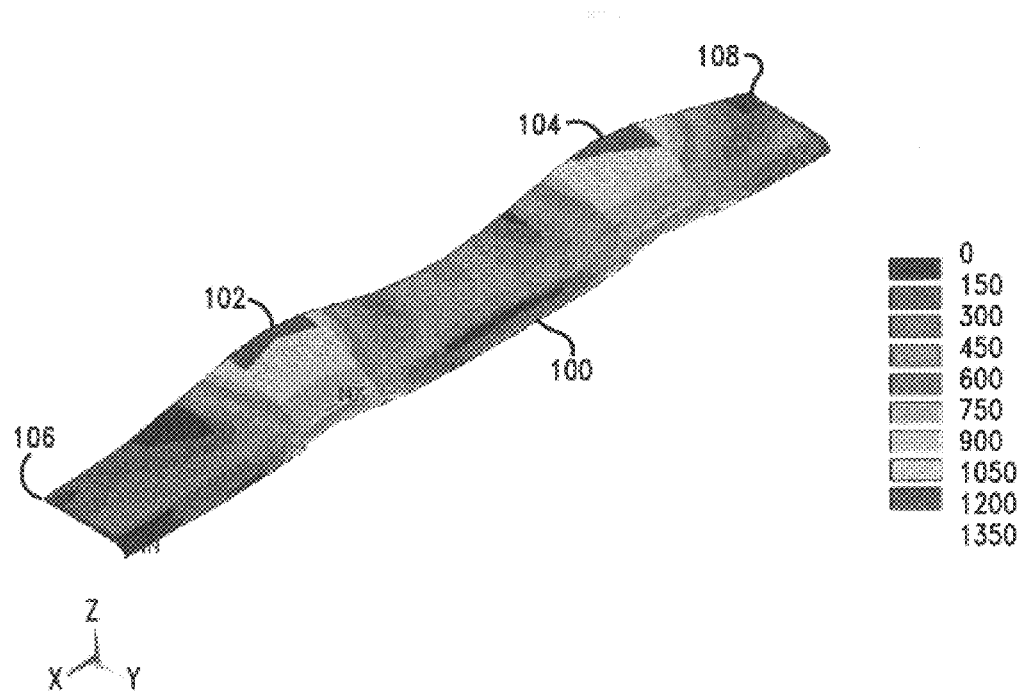
FIGS. 7 and 8 are computer simulations of the panel stress distributions.
Figure 8:
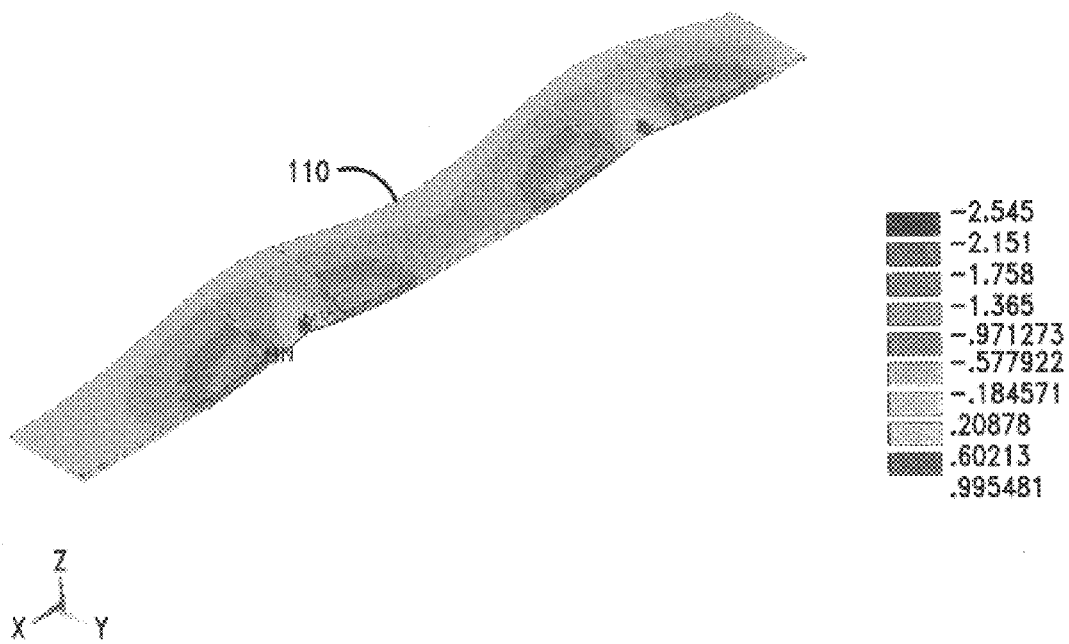

As illustrated in FIGS. 7 and 8, discussed below, virtually all of the bending loads which are encountered by the monocoque joint 30 of the invention, due to the load on the trailer and the torsion caused by uneven roads and bumps, is transferred along the skin portions 50a, 50b, 52a, 52b of the preformed panels 50, 52. The noted continuous integral load path is not taught or suggested by any prior art joint structure.

Figure 6:
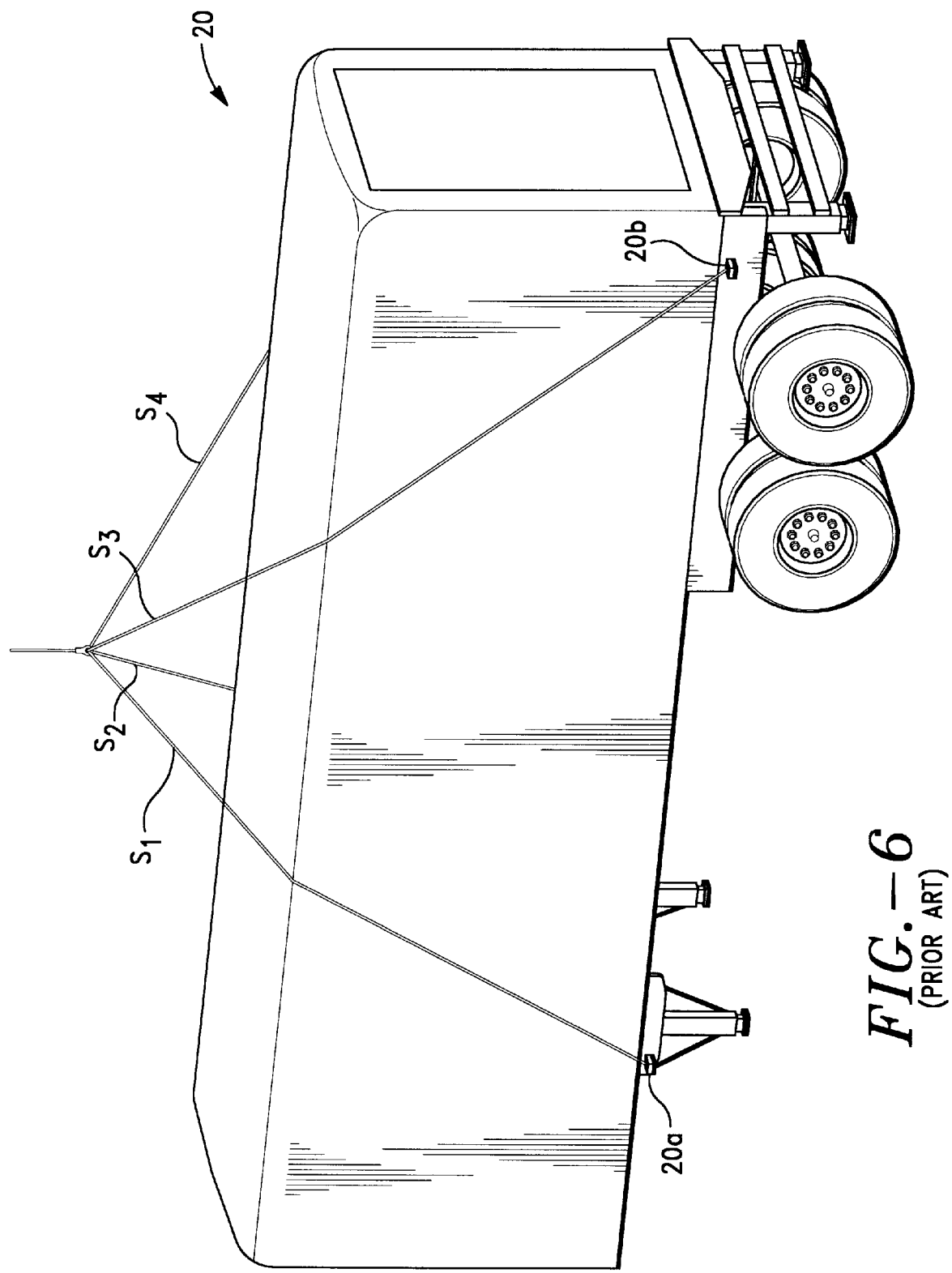
FIG. 6 is a perspective view of a conventional trailer subjected to a sling load.

Referring first to FIG. 6, there is shown the trailer 20 subjected to a typical sling load. The sling load (denoted by Arrow L) is transmitted through slings $S_1$–$S_4$ to points 20a and 20b on the trailer.

Referring now to FIGS. 7 and 8, the computer simulations, generated by finite element analysis, graphically illustrate the optimum stress distribution of the skin and core of the roof panel. As illustrated in FIG. 7, the maximum VonMises stress exhibited by the panel skin portion 100 is merely 1456 psi. The noted stress is also concentrated proximate the sling points 102, 104.

It is also significant to note that the panel 100 does not exhibit any localized stress concentrations proximate the joints 106, 108 (i.e., edge). This graphically illustrates the unique load transferring characteristics of the joint.

As illustrated in FIG. 8, the maximum shear stress of the core 110 resulting from the sling load (L) is merely 2.5 psi. The noted shear stress is similarly concentrated proximate the sling points. As will be appreciated by one having ordinary skill in the art, the minimal core stress(es) allows for the use of various lightweight core materials.

According to the invention, the preformed panels 50, 52 may comprise various materials and/or elements, such as a series of pultruded box section tubes bonded together to form a wall panel. The preformed panels 50, 52 could also be formed by extrusion or hand layout of the materials.

The preformed panels 50, 52 could also comprise laminated or molded architectural panels, metal laminated wood core, solid core faced panel, plywood on face, fiberglass reinforced plywood or metal panels with internal corrugation.

As will be appreciated by one having ordinary skill in the art, the tapered flange sections 48, 49 facilitate the employment of substantially uniform thickness panels 50, 52, which can be easily formed by a standard pultrusion process. As a result, multiple preformed panels can be formed by merely cutting a continuous strip of pultruded material.

As discussed above, the tapered flange sections 48, 49 facilitate the transfer of the applied bending loads to the skins 50a, 50b, 52a, 52b of the preformed panels 50, 52. As a result of this load transfer, the thickness of the panel skins 50a, 50b, 52a, 52b and, hence, the weight of the composite structure 30, 50, 52 can be significantly reduced. If the composite structure is employed in a trailer, the noted reduction in weight can, and in many instances will, increase the effective payload of the tractor-trailer. In addition, a curved structure formed with the unique monocoque joint of the present invention will exhibit improved aerodynamic characteristics, increasing fuel efficiency.

Figure 9:
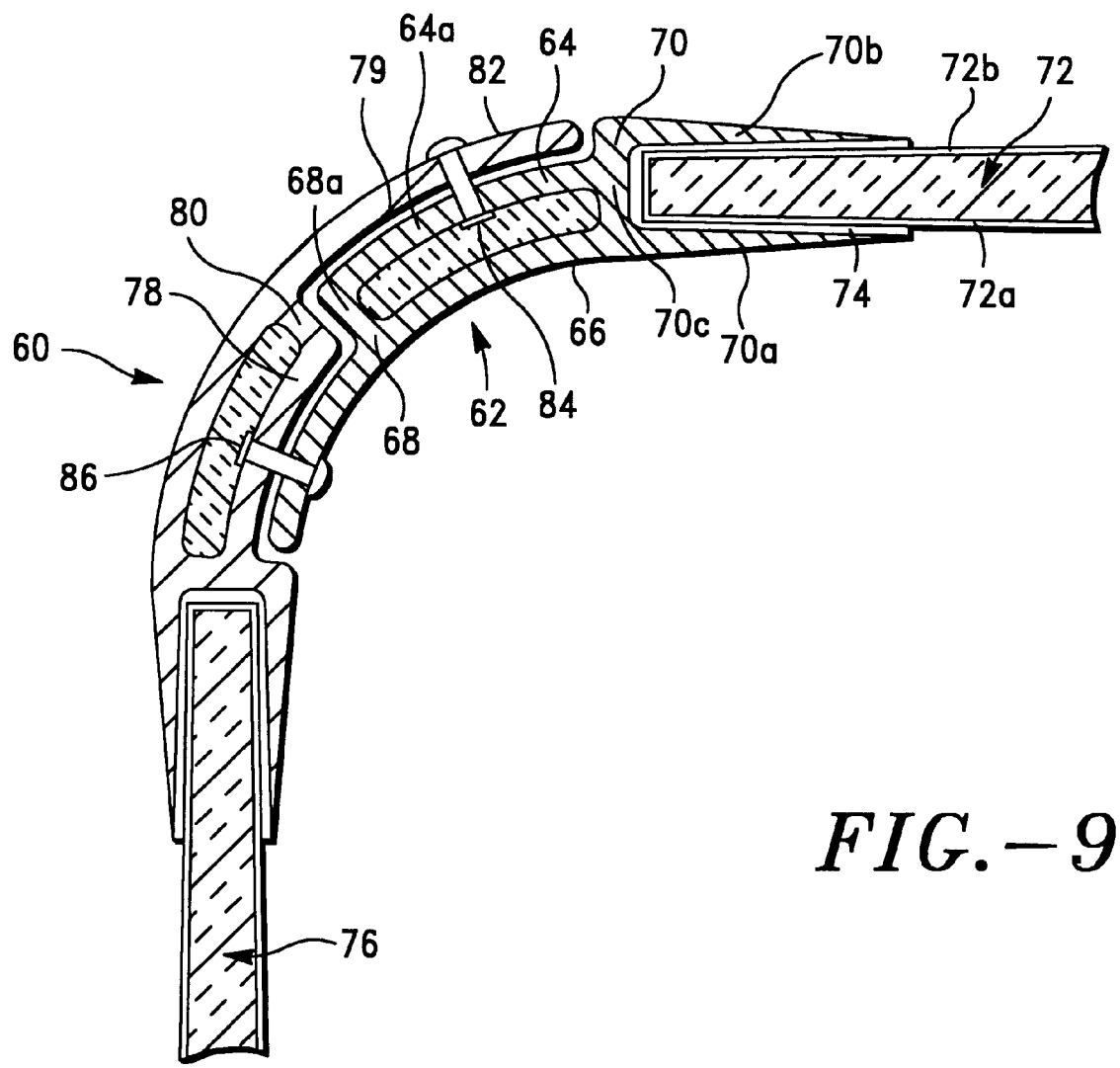
FIG. 9 is a cross-sectional view of an additional embodiment of the monocoque joint according to the invention.

Referring now to FIG. 9, there is shown a cross-sectional view of an additional embodiment of the joint of the present invention. This embodiment employs two half-joint sections 60 and 62. Half-joint section 62 includes an outer skin portion 64, an inner skin portion 66, and an inner joint-forming section 68, having an inner web section 68a connecting the inner skin 66 with the outer attachment portion 64a of the outer skin 64. The inner joint-forming section 68 also includes an inner flange section 68b integrally formed with the inner skin 66.

Half-joint section 62 also includes an outer joint forming section 70 including two tapered flange sections 70a, 70b integrally formed with the inner and outer skins 66, 64. According to the inventions, this outer joint-forming section 70 functions similar to the outer joint-forming sections 36, 38 of the embodiment shown in FIG. 4. The outer joint forming section 70 also includes an outer web 70c connecting the outer and inner skin sections 66, 64.

The half-joint section 62 can similarly be attached to a preformed panel 72 by use of an adhesive layer 74. As discussed in detail above, the tapered flanges 70a, 70b facilitate substantially uniform load transfer to the skins 72a, 72b of the preformed panel 72.

In the same manner as the first half-joint section 62, second half-joint section 60 can also be attached to a series of preformed panels, such as that shown at 76, with an adhesive or other fastening means. When the adhesive has completely set, the two sections, preformed panel 72 with half-joint 62 and preformed panel 76 with half-joint 60, can be attached together.

This attachment is accomplished by placing an adhesive layer 79 between the half-joints 60, 62. The inner flange section 68b on half-joint 62 overlaps and attaches to the inner attachment portion 78 of half-joint 60. The inner web portion 68a of half-joint 62 abuts the inner joint section 80 of the half-joint 60. The outer flange portion 82 of the half-joint 60 overlaps and is attached to the outer attachment portion 64a of the half-joint 62. Bolts such as bolts 84, 86 can be used to connect the half-joint sections 60, 62 while the adhesive layer 79 sets. Alternatively, blind rivets or other fasteners could be employed.

The noted embodiment of the joint has virtually all of the advantages and/or benefits as the embodiment shown in FIG. 4. The use of the two half-joint sections 60, 62 has the additional benefit in that the half-joint sections 60, 62 may, in some instances, make it easier to assemble trailer structure.

Figure 10:
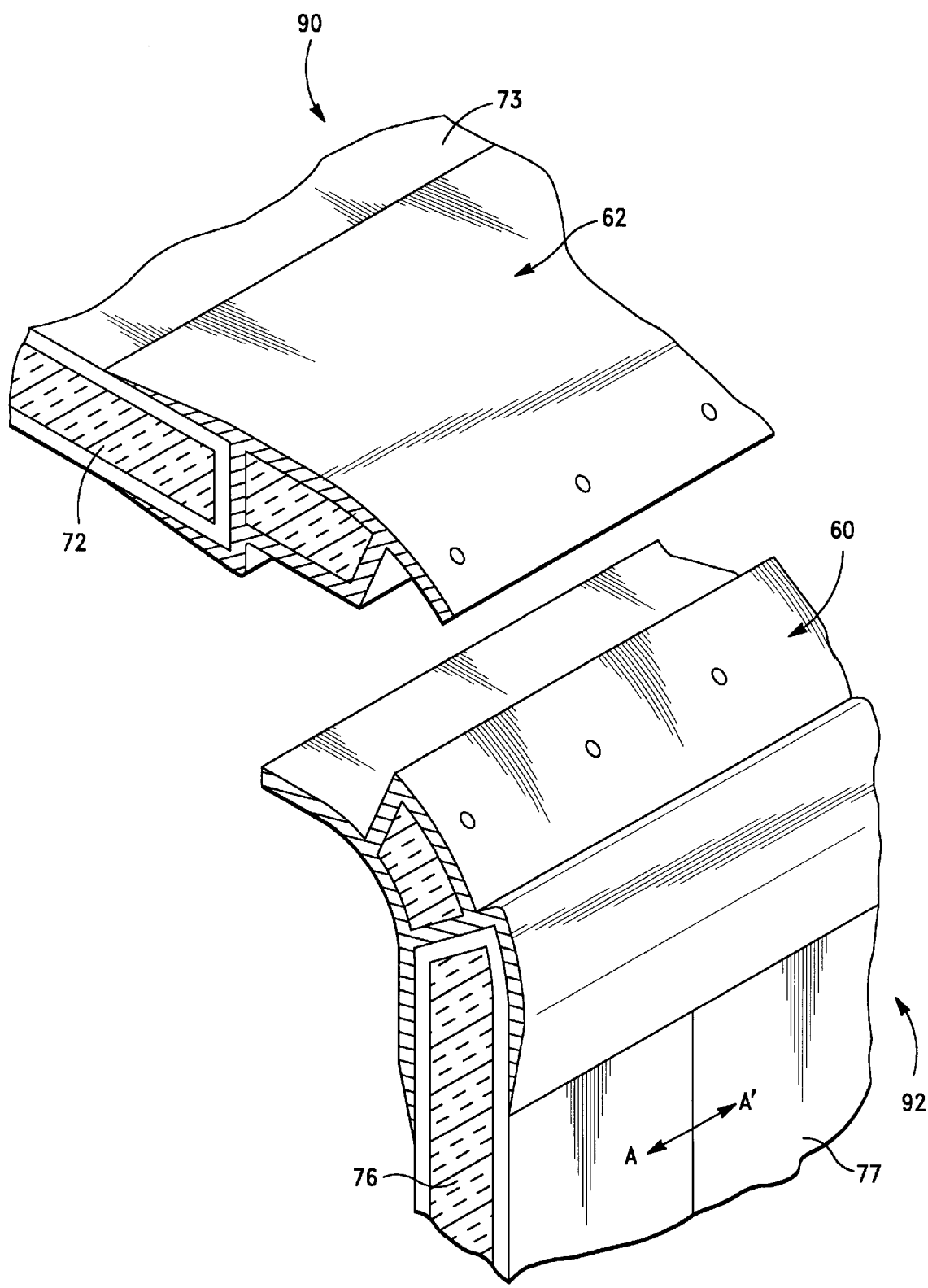
FIG. 10 is an exploded perspective view of the monocoque joint shown in FIG. 9 according to the invention.

Referring now to FIG. 10, there is shown an exploded perspective view of the joint shown in FIG. 5. To illustrate the ease of assembly of the joint, half-joint section 60 is initially attached to preformed panels 76, 77. Half-joint section 62 is then attached to preformed panels 72, 73. After these pieces are connected together, the two sections 90, 92 are then connected as discussed above.

Figure 11:
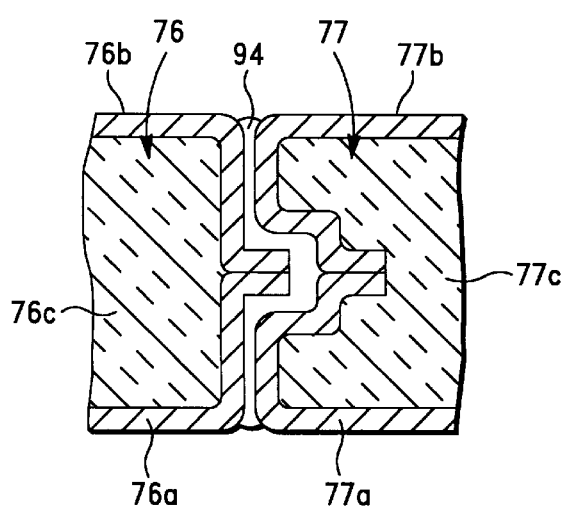
FIG. 11 is a partial cross-sectional view, illustrating the connection of two preformed panels.

Referring now to FIG. 11, there is shown a partial cross-sectional view, illustrating the connection of two preformed panels 76, 77. The preformed panels 76, 77 are typically connected together with an adhesive or other fastening means 94. In this manner, a series of wall panels can be attached together in series with the joint structures of the present invention.

Figure 1:
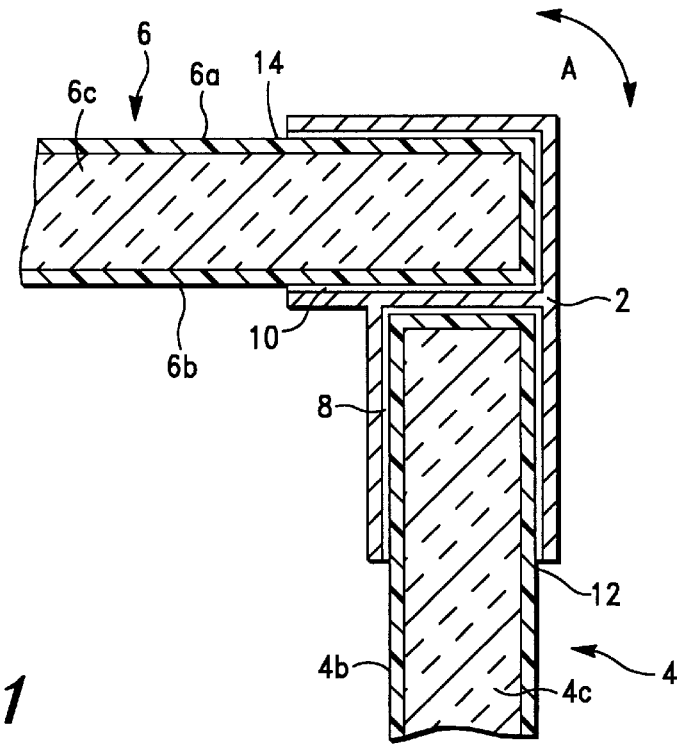
FIG. 1 is a cross-sectional view of a prior art composite joint structure.
Figure 2:
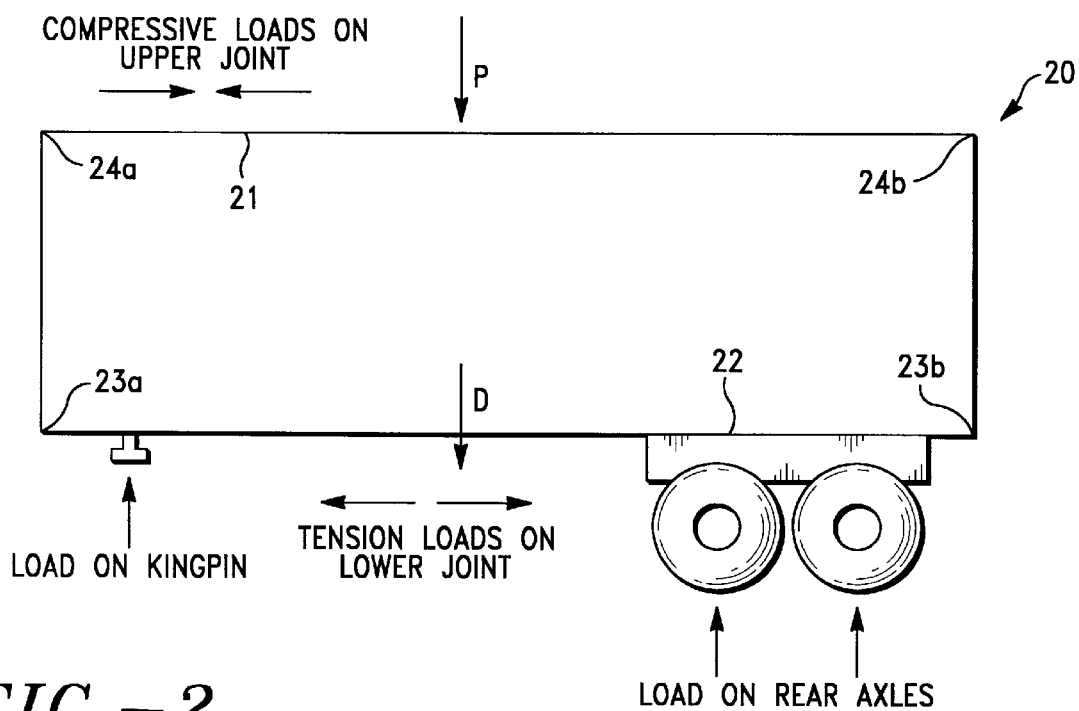
FIG. 2 is a side plan view of a conventional trailer.

The use of the one piece curved "C"-shaped joint 30 or use of the two combined half-joints 60, 62 allows for a more efficient structure. Because the bending at the corners of the prior art joint structure of FIG. 2 acts essentially as a hinge, the aluminum joints on a conventional trailer must be made heavy enough to carry the bending loads. In addition, the thin walls of the trailer will do little as far as carrying the bending load or transverse compressive loads, such as that produced by a sling load. This heavy cornered and thin skinned structure is far less efficient than a true stressed skin or substantially monocoque structure and, as a consequence, the prior art structure weighs more than the structure of the present invention.

SUMMARY

From the foregoing description, one of ordinary skill in the art can readily appreciate that the present invention provides a lightweight and efficient monocoque joint structure which provides a continuous integral load path to joined panels and exhibits a substantially uniform stress profile.

In contrast to prior art structures, the monocoque joint structures of the present invention allow for the use of substantially flat preformed panels. The flange sections, which engage the preformed panels, are specifically designed and adapted to uniformly transmit loads to the joined preformed panels when subjected to loads. In this manner, the preformed panels become efficient load bearing members.

In addition, since the monocoque composite joint does not function like a conventional hinge, the panels can be fabricated out of lighter and thinner materials. In the case of current composite structures employing conventional joint designs, the ends of the panels and the cross section of the right angled corner joint are major stress risers when subjected to torsion and/or bending loads, and therefore must be much heavier and thicker than that allowed by the joint of the present invention.

An additional benefit of the present invention is the ability to employ the monocoque joint structure with a preformed panel having a substantially uniform skin thickness.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A monocoque joint, comprising:
   a first skin portion having a first exterior surface and a first interior surface;
   a second skin portion having a second exterior surface and a second interior surface;
   a plurality of web sections, each of said web sections being in communication with said first interior surface and said second interior surface;
   said web sections and said first and second interior surfaces defining a plurality of core regions, each of said core regions including a core material; and
   first and second tapered flange sections disposed on opposing ends of said joint;
   said first and second flange sections being formed integrally with said first and second skin portions;
   said first and second flange sections being adapted to receive a preformed panel;
   said joint providing a substantially continuous integral load path whereby when said first and second flange sections are operatively attached to preformed panels and subjected to a load the load is substantially uniformly transmitted to said panels.

2. The joint of claim 1, wherein said skin portions exhibit a substantially uniform stress profile when said joint is subjected to a bending load.

3. The joint of claim 1, wherein said core material comprises a closed cell foam.

4. The joint of claim 1, wherein said first and second skin portions comprise a layered fiberglass and resin structure.

5. The joint of claim 4, wherein said first and second skin portions include 4 to 6 layers of said fiberglass and resin structure.

6. A composite structure, comprising:
   a monocoque joint having
   a first skin portion having a first exterior surface and a first interior surface,
   a second skin portion having a second exterior surface and a second interior surface,
   a plurality of web sections, each of said web sections being in communication with said first interior surface and said second interior surface,
   said web sections and said first and second interior surfaces defining a plurality of core regions, each of said core regions including a core material,
   first and second tapered flange sections disposed on opposing ends on said joint,
   said first and second tapered flange sections being formed integrally with said first and second skin portions,
   said first and second flange sections including panel engagement sections;
   a first preformed panel attached to said first flange section panel engagement section; and
   a second preformed panel attached to said second flange section panel engagement section;
   said joint providing a substantially continuous integral load path whereby when said first and second preformed panels are subjected to bending or torsional loads said joint substantially uniformly transmits said loads to said preform panels while said first and second skin portions exhibit a substantially uniform stress profile.

7. The joint of claim 6, wherein said core material comprises a closed cell foam.

8. The joint of claim 6, wherein said first and second skin portions comprise a layered fiberglass and resin structure.

9. The joint of claim 8, wherein said first and second skin portions include 4 to 6 layers of said fiberglass and resin structure.

10. A composite structure, comprising:

first and second half-joint sections, said first half-joint section having a first skin portion, a second skin portion, a first core segment disposed between said first and second skin portions, a first joint forming section including a first web section connected to said first and second skin portions and first and second tapered flange sections formed integrally with said first and second skins respectively, and a second joint forming section including a second web section connected to said first and second skin portions, said second joint forming section including a third flange section formed integrally with said second skin portion, said first half-joint section including a first-half joint section seat disposed proximate said second skin portion;

said second half-joint section having a third skin portion, a fourth skin portion, a second core segment disposed between said third and fourth skin portions, a third joint forming section including a third web section connected to said third and fourth skin portions and fourth and fifth tapered flange sections formed integrally with said third and fourth skins respectively, and a fourth joint forming section including a fourth web section connecting said third and fourth skin portions, said fourth joint forming section including a sixth flange section formed integrally with third skin portion, said second half-joint section including a second half-joint section seat disposed proximate said fourth web section, said second section being adapted to receive said first half-joint section seat.

11. The structure of claim 10, wherein said first, second, third and fourth tapered flange sections are adapted to receive a preformed panel.

12. The structure of claim 11, wherein each of said first and second flange sections are attached to a first preformed panel and said third and fourth flange sections are attached to a second preformed panel.

13. The structure of claim 11, wherein said first and second half-joint sections provide a substantially continuous integral load path when said first and second panels are subjected to bending and torsional loads.

* * * * *